June 18, 1929.
A. LYSHOLM
1,718,163
RADIAL GAS OR STEAM TURBINE
Filed April 11, 1928
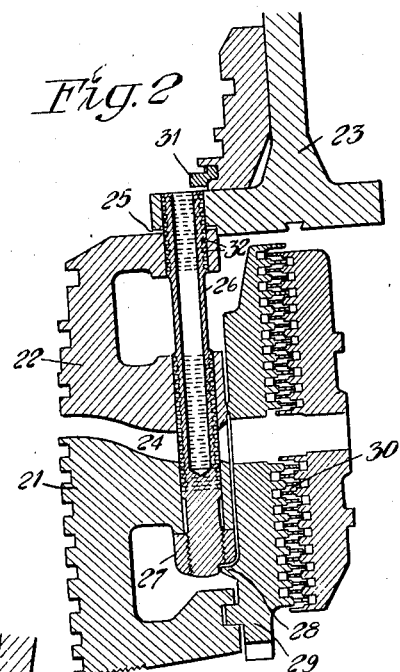
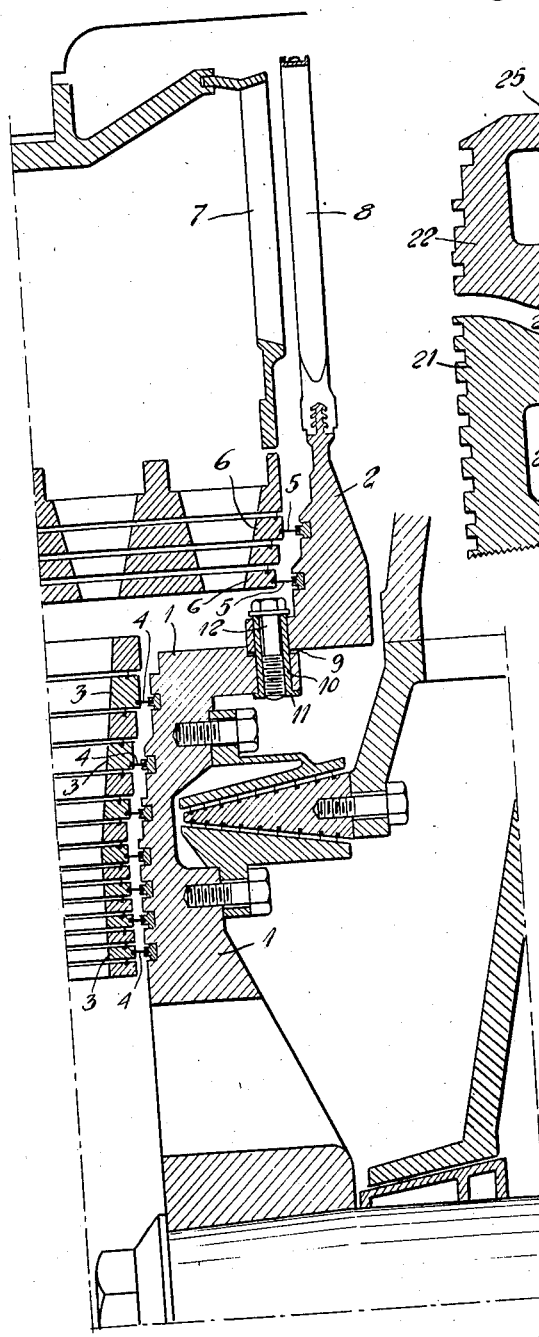
Inventor:
Alf Lysholm
by Cameron, Kerkam & Sutton.
Attorneys.

Patented June 18, 1929.

1,718,163

UNITED STATES PATENT OFFICE.

ALF LYSHOLM, OF STOCKHOLM, SWEDEN, ASSIGNOR TO AKTIEBOLAGET LJUNGSTROMS ANGTURBIN, OF STOCKHOLM, SWEDEN, A JOINT-STOCK COMPANY.

RADIAL GAS OR STEAM TURBINE.

Application filed April 11, 1928, Serial No. 269,156, and in Sweden April 27, 1927.

The inner parts of radial gas- or steam-turbines consist substantially of rotating members which may be divided into two groups of blade rings mounted the one inside the other, said blade rings being disposed each on one of two turbine disks one of which rotates or both of which rotate in opposite directions. The driving medium passing through these blade rings between the two turbine disks gives off its heat gradually. Thus, the temperature of the turbine disks will also decrease gradually outwards, so that the turbine disks will obtain a temperature at their outer edge which is only so much higher as is involved by heat convection outwards from the central warmer parts of the disk. Temperature strains that may arise in consequence of this may act deforming on the turbine disk in the axial direction. To prevent such deformations, the turbine disks must be divided into rings arranged radially outside one another. It has been previously proposed (see the U. S. Patent No. 926,814) to keep together the rings arranged in said manner outside each other by means of radial bolts. Likewise, it has been proposed to give these radial bolts a conical shape increasing in an outward direction, in order to ensure a rigid connection under all circumstances between the rings arranged outside one another.

It has been found that these previously known constructions have not, particularly not in large aggregates, been capable of fulfilling the requirements that must be demanded, first, from the point of view of strength, and, second, from the point of view of centering.

The present invention relates to such turbines, where the annular elements arranged outside one another are kept together by means of bolts. The invention refers to a construction of these bolts where the expansion of the annular elements in different degrees is ensured, and the invention consists in that the bolts are hollow, either wholly or partly.

The invention will be described more closely with reference to the accompanying drawings which illustrate two embodiments of the same. Fig. 1 shows an axial section of a part of a radial turbine having a turbine disk divided into two annular elements. Fig. 2 also shows a part of a similar turbine in the same section and having a turbine disk divided into three parts.

In Fig. 1, 1 designates the inner annular part and 2 the outer annular part of a turbine disk. The inner part 1 serves to support blade carrying rings 3 through the medium of expansible attachments 4. The blade rings 3, which rotate, are threaded between blade rings rotating in the opposite direction, the latter blade rings being carried by a turbine disk or the like not shown in the drawing. The driving medium passes in known manner through this blade group from within the center and outwards, after which the driving medium passes still another group of blades, also in known manner, the blade rings 6 of the latter group of blades being connected through expansible attachments 5 to the outer annular element 2. The blade rings 6 are in this case also threaded between blade rings carried by a turbine disk or the like, not shown. After the steam has passed through this group of blades, it flows past the stationary guide blade 7 and the radially disposed blade 8, which latter is arranged direct on the annular element 2. Inasmuch as the driving medium has a higher temperature in the center of the turbine than, for instance, in the blade groups carried by the member 2, members 1 and 2 of the turbine disk will expand in relation to each other to a different extent. The inner member 1, which is situated in the hotter zones, will thus be subjected to a greater expansion than the member 2 on the admission of the driving medium. The member 2 being situated radially outside the member 1, it is thus necessary that a play be provided between these members, as at 9. At these portions the two annular elements, into which the turbine disk is divided, are provided with registering holes. In the embodiment shown in Fig. 1, radial hollow bolts 10 have been fitted through said holes. The external diameter of these bolts is so great with respect to the diameter of the holes that the bolts must be pressed into the holes when all parts are in the cold state, in order to ensure contact between the bolts and the walls of the holes by a great pressure between the bolts and the hole walls. It is exactly with the aid of the resiliency brought about by the hollowness of the bolt that the bolt may be pressed into the holes notwithstanding the fact that the bolt has a comparatively great diameter relatively to the holes. Thus the bolts will keep the annular elements 1 and 2 in the mutual positions desired, while at the same time facilitating different expansion of the said elements on heating of the material, inasmuch as the one turbine member may then slide on the bolt by reason of the expansion.

In order that the bolt shall not be gradually displaced out of its holes, the same is provided with stopping means which in this embodiment consist of a flange indicated at 11, and of an inner stud bolt 12 threaded fast into the bolt 10 and provided with a nut head.

The turbine disk shown in Fig. 2 consists of three annular elements 21, 22 and 23 arranged radially outside one another. Similarly as in Fig. 1, the inner annular element 21 carries an inner group of blades, while the element 22 carries an outer group of blades, and the element 23 the outermost group of blades for radial flow and the radial blade rim for axial flow. Provided between the annular elements 21 and 22 is a passage 24 for drawing off or admitting the driving medium. Between the annular elements 22 and 23 is also a play 25, for which reason all annular elements surrounded by driving medium of different temperatures may expand to a different extent. All annular elements are provided with holes arranged outside each other and corresponding to each other, through which holes the hollow bolt 26 is extended. This hollow and, consequently, resilient bolt is pressed hard into the holes, as in Fig. 1, so that it will always fill the holes even if the latter become somewhat larger on the expansion of the annular parts than when the turbine is cold, whereby all three parts of the turbine disk are retained in the intended positions.

In this embodiment the bolts pass through all parts of the turbine disk, and in certain cases they have a smaller diameter than the holes in the annular elements. In case the bolts would happen to seize in the holes, they will, by an elongation particularly of those parts which are of smaller diameter, facilitate different expansion of the annular elements in relation to each other. Normally, however, the annular parts should be able to slide on the bolts at the prevalent high temperature.

The bolts are also provided with grooves or turned-out portions 32, in order to prevent spreading of a seizure if such seizure would happen to occur. The grooves may also be filled with some suitable lubricant ensuring movement between the bolts and the elements. In order that the bolt shall not be capable of wandering out of the holes, the bolt is provided with threads at the bottom and also carries a nut 27 provided with a recess fitting to an abutment 28 in the parts 29 pertaining to the rotary part of the labyrinth sealing 30 of the turbine. After the bolt has been inserted into its position, the part 29 is mounted in position, the abutment 28 being then in such a position that the nut 27 cannot be screwed off by itself while the bolt 26 also cannot move inwardly toward the center of the turbine. Furthermore, the nut 27 prevents the bolt from moving radially outwards; further to prevent this movement there is provided a boss 31 at the outer end of the bolt.

By means of a construction in accordance with the invention, it will be possible to keep the annular elements together into which the turbine disk is divided, in such a manner that they may expand relatively to each other, without assuming positions detrimental to the running of the turbine, and without incurring the risk of the retaining parts being subjected to such forces that would cause breakage thereof.

What I claim is:—

1. In radial gas or steam turbines, the combination of turbine disks divided into annular elements disposed outside one another, and hollow bolts connecting said elements.

2. In radial gas or steam turbines, the combination of turbine disks divided into annular elements disposed outside one another, and partially hollow bolts connecting said elements.

3. In radial gas or steam turbines, the combination of turbine disks divided into annular elements disposed outside one another, holes in said annular elements adapted to receive connecting bolts, and hollow bolts extending through said holes with a tight fit.

4. In radial gas or steam turbines, the combination of turbine disks divided into annular elements disposed outside one another, holes in said annular elements adapted to receive connecting bolts, and hollow bolts extending through said holes with a tight fit, said bolts having a restricted diameter along their uncovered portion or portions when in connecting position.

5. In radial gas or steam turbines, the combination of turbine disks divided into annular elements disposed outside one another, holes in said annular elements adapted to receive connecting bolts, hollow bolts extending through said holes with a tight fit, and annular grooves or channels in the surfaces of the bolts contacting with the walls of the holes.

In testimony whereof I affix my signature.

ALF LYSHOLM.